Feb. 16, 1960 — L. P. FRIEDER ET AL — 2,925,141
LADDER NET
Filed April 14, 1955 — 2 Sheets-Sheet 1
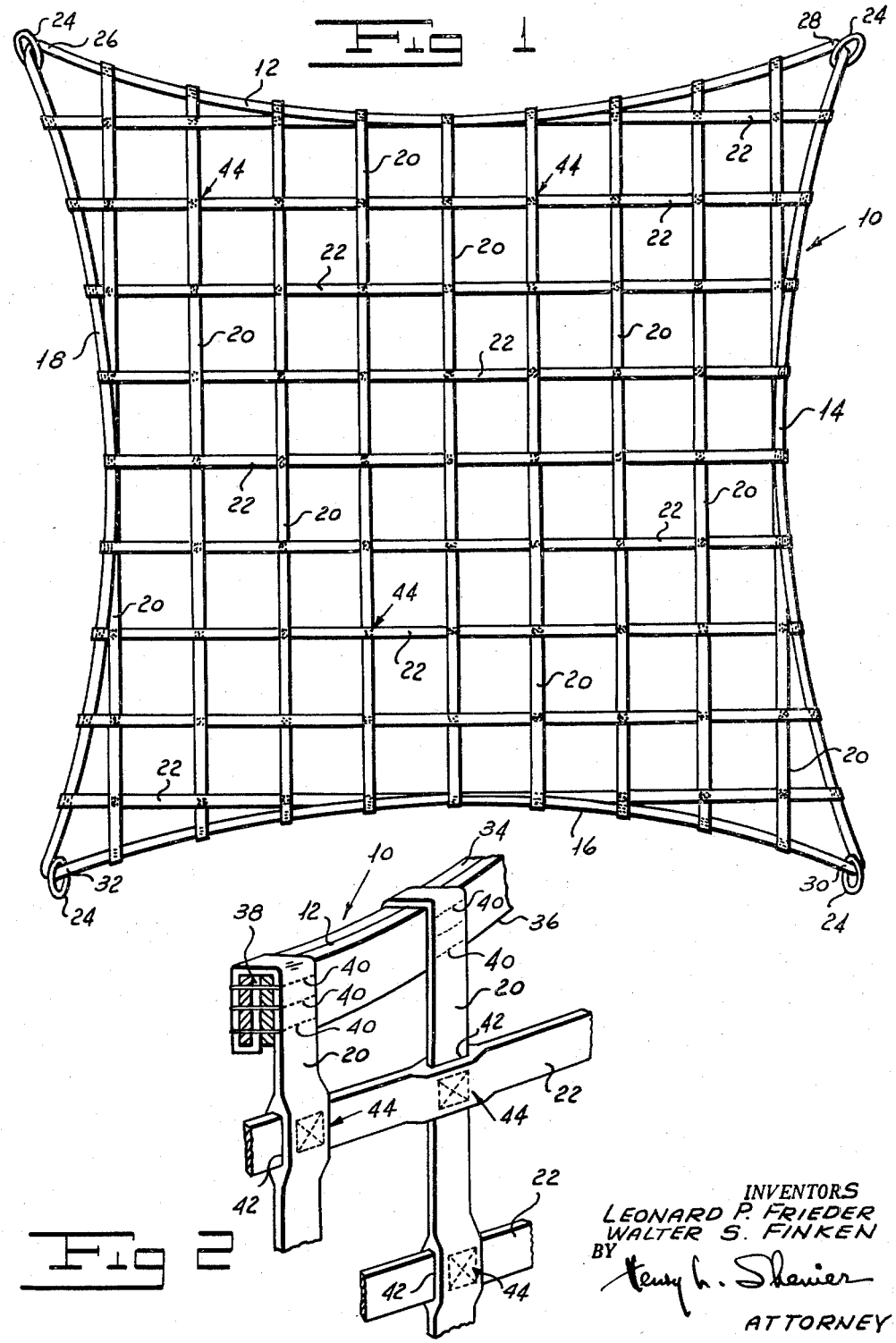
INVENTORS
LEONARD P. FRIEDER
WALTER S. FINKEN
BY
ATTORNEY

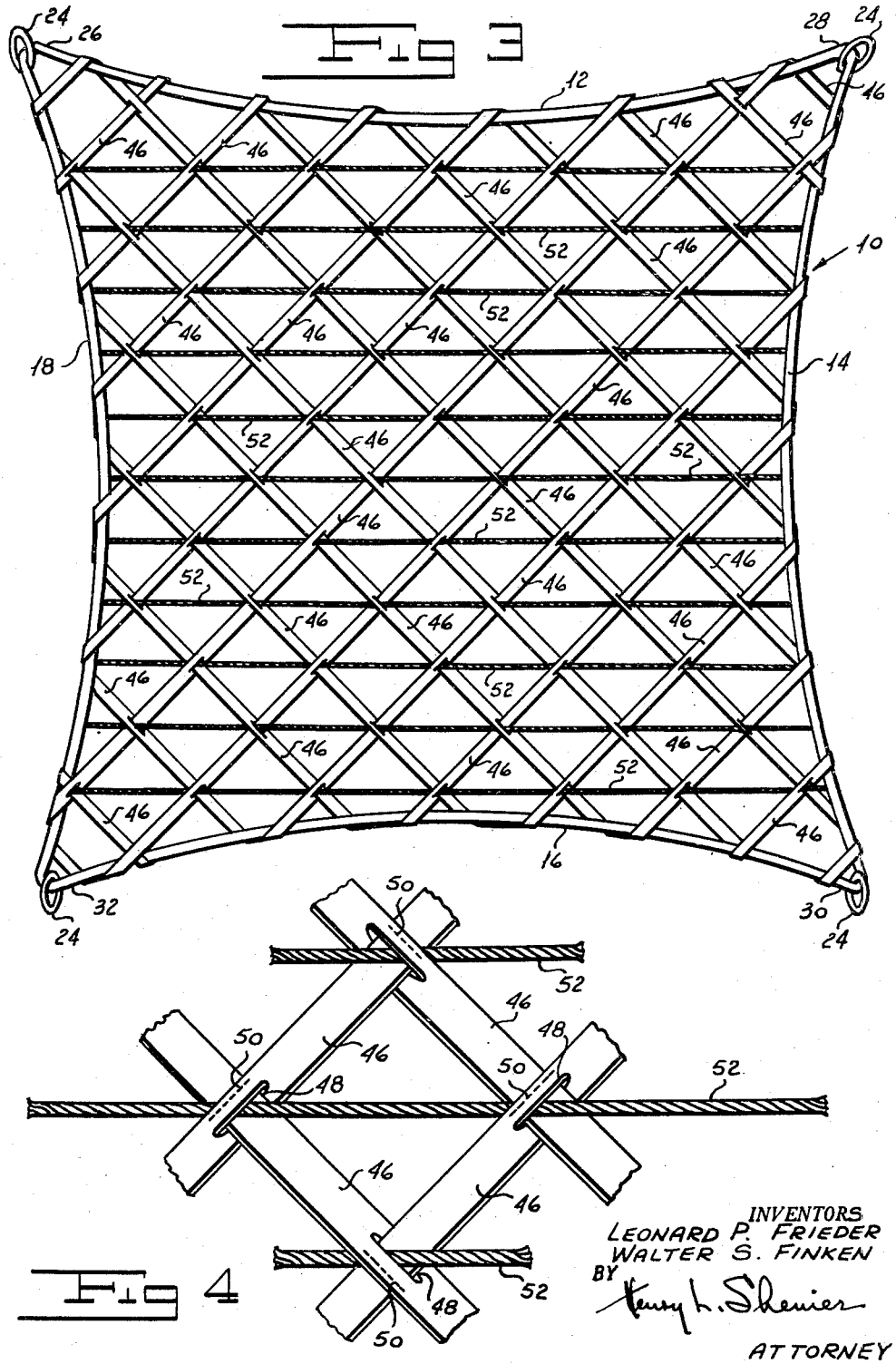

United States Patent Office

2,925,141
Patented Feb. 16, 1960

2,925,141

LADDER NET

Leonard P. Frieder, Great Neck, and Walter S. Finken, Brooklyn, N.Y.; said Finken assignor to said Frieder Application April 14, 1955, Serial No. 501,368

5 Claims. (Cl. 182—196)

Our invention relates to a ladder net, and more particularly to a ladder net which is safe and in which the load is substantially uniformly distributed among the individual net mesh members and in which the net members are formed of webbing.

Cargo nets of the prior art generally have a square or rectangular contour formed by a number of straight side members and a square or rectangular net mesh configuration. Very often these nets are suspended by a pair of adjacent corners over the side of a ship, or the like, to act as ladders. The net mesh members parallel to the side extending between the corners by which the net is suspended function as the rungs of the ladder. When a load is applied to the net, as by men climbing the net, the side extending between the corners from which the net is suspended assumes a catenary shape. This action results in a number of disadvantages. Since the nets of the prior art are formed with equal length mesh members extending between opposite sides, when a side assumes a catenary shape under load, the individual net mesh members are unequally loaded. In addition, the assumption of a catenary shape by the net side permits the net mesh members acting as rungs to sag under the load of men climbing up or down the net. These sagging mesh members provide insecure footing. Intersecting mesh members of cargo nets of the prior art are secured at points of intersection by means, such as stitching or the like. When this stitching breaks under the load of men climbing the net, the mesh member which acts as a rung tears away from the net body and the same result follows as would follow if the rung of a ladder being climbed by the man had broken. From the foregoing it will be seen that cargo nets of the prior art, when used as ladders, do not ensure a uniform distribution of load among the individual net mesh members and do not provide a safe and secure footing. It will be appreciated also that cargo nets of the prior art which have other than a rectangular net mesh configuration cannot effectively function as ladders, since, when suspended from one side, they do not have horizontally extending mesh members to act as rungs.

One object of our invention is to provide a ladder net in which loads applied to the net, when in use as a ladder, are substantially uniformly distributed among the individual net mesh members.

Another object of our invention is to provide a ladder net in which the net mesh members acting as rungs do not sag when the net is in use as a ladder.

A further object of our invention is to provide a ladder net made of webbing which affords a safe and secure footing.

Other and further objects of our invention will appear from the following description.

In general, our invention contemplates the provision of a ladder net including a number of sides, each of which has the shape of a catenary extending inwardly from the periphery toward the center of the net. We form the net sides from a peripheral member and secure the webbing mesh members of the net to the peripheral member. In one form of our invention one group of webbing net mesh members extends parallel to a line passing through a pair of adjacent corners of the net. The remaining net mesh members are perpendicular to the members of the group of net mesh members to form a substantially square or rectangular net mesh configuration. One group of members acts as rungs and the remaining members act as uprights when the net is used as a ladder. In a second form of our invention we arrange the net mesh members to form a rhomboidal net mesh configuration and use ratlines to form rungs when the net is used as a ladder. We employ a slotted construction to join intersecting net mesh members at the points of intersection to prevent a net mesh member from tearing away from the net under load.

In the accompanying drawings which form part of the instant specification and which are to be read in conjunction therewith and in which like reference numerals are used to indicate like parts in the various views:

Figure 1 is a plan view of one form of our ladder net.

Figure 2 is a fragmentary perspective view, drawn on an enlarged scale, of the form of our net shown in Figure 1, showing the manner in which individual net mesh members are secured to the peripheral member.

Figure 3 is a plan view of an alternate embodiment of our ladder net.

Figure 4 is a fragmentary perspective view, drawn on an enlarged scale, of the form of our net shown in Figure 3, showing the manner of joining intersecting net mesh members at the points of intersection.

More particularly referring now to Figures 1 and 2 of the drawings, our ladder net includes a peripheral member, indicated generally by the reference character 10, forming the respective sides 12, 14, 16 and 18 of the net. Each of the sides 12, 14, 16 and 18 has the shape of a catenary curving inwardly toward the center of the net. This shape of the sides may conveniently be determined by the lengths of the individual net mesh members secured between opposite sides of the net.

We secure a first group of net mesh members 20 between the sides 12 and 16 of the net in a manner to be described. We secure a second group of individual net mesh members 22 between sides 14 and 18 of the net in a manner to be described hereinbelow. Mesh members 20 intersect the net mesh members 22 to form a substantially square or rectangular net mesh configuration. Suspension rings 24 carried by the peripheral member 10 at its respective corners 26, 28, 30 and 32 provide a means by which the net may be suspended or by means of which the net may be gathered about cargo when being used as a cargo or hold down net.

Referring now to Figure 2, the peripheral member 10 may conveniently be formed of a pair of webbing laminates 34 and 36. Although any suitable means may be used to form mesh members 20 and 22, we advantageously form the individual net mesh members 20 and 22 from textile webbing. In order to secure an individual net mesh member, such, for example, as a member 20, to the side 12 of the net, we pass the end 38 of the member 20 around both webbings 34 and 36 and insert it between webbings 34 and 36. Any appropriate means, such as stitching 40, retains the end 38 in position with relation to webbings 34 and 36.

In our copending application Serial No. 449,893, filed August 16, 1954, we disclose a novel means for securing intersecting net mesh members to each other at points of intersection. We employ one form of this means to secure members 20 to the members 22 which they intersect. We form a plurality of transverse channels 42 in each of the members 20 and 22 at spaced locations along its length. In the direction of its length a member 20 alternately passes through a channel 42 in a mesh member 22 which it intersects, and has in turn a mesh member 22 passing through one of its channels 42. Stitching, indicated generally by the reference character 44, secures the mesh members 20 to the mesh members 22 at points of intersection. This improved means for securing intersecting net mesh members to each other prevents a net mesh member from being torn away from the net body in the event the stitching 44 breaks for any reason. As a result, the possibility of a broken rung when the net is being used as a ladder and accompanying danger or inconvenience to personnel is reduced.

In the form of our invention shown in Figure 1, mesh members 22 are substantially parallel to a line passing through corners 26 and 28 of the net, while mesh members 20 are substantially parallel to a line passing through the corners 28 and 30 of the net. When the net is in use as a ladder, it may be suspended by the rings 24 at any pair of adjacent corners, such, for example, as the corners 26 and 28. When the net is so suspended, one group of net mesh members, such, for example, as members 22, acts as the rungs of the ladder while the other group of net mesh members, such as the members 20, acts as ladder uprights. Members 20 are not all of the same length. The length of members 20 increases from the center member 20 outwardly to the members 20 adjacent sides 14 and 18. Similarly, the length of members 22 increases outwardly from the center member 22 to the members 22 adjacent sides 12 and 16. This construction conforms the net body with the shape of the sides 12, 14, 16 and 18. As a consequence of this construction, when the net is suspended, a load applied to the net is distributed substantially equally among the net mesh members. Individual net mesh members are not unequally stressed, as in nets of the prior art having square or rectangular peripheries.

The form of our invention shown in Figures 3 and 4 includes a peripheral member 10 having sides 12, 14, 16 and 18 and corners 26, 28, 30 and 32. As in the form of our invention shown in Figures 1 and 2, we dispose suspension rings 24 at the respective corners of the net. We form the individual net mesh members 46 of this form of our invention from textile webbing and dispose the members 46 relative to one another to form a rhomboidal net mesh configuration similar to the configuration disclosed in our said copending application. The members 46 may conveniently be formed of a single length of textile webbing. Any convenient means, such as stitching or the like, secures the mesh members to the peripheral member 10.

As can be seen by reference to Figure 4, each member 46 is formed with a plurality of longitudinally extending slots 48 at spaced locations along its length. In the direction of its length, each member 46 alternately passes through a slot 48 of a member 46 which it intersects and has in turn a member 46, which it intersects, passing through one of its slots 48. Any convenient means, such as stitching 50 or the like, may be employed to secure a pair of intersecting net mesh members to each other at a point of intersection. The structure of this form of our invention thus far described would not function efficiently as a ladder if suspended by rings 24 at a pair of adjacent corners, since members 46 are not parallel to any line passing through a pair of adjacent corners. The catenary configuration of sides 12, 14, 16 and 18 does, however, evenly distribute a load applied to the net when suspended by rings 24 at a pair of adjacent corners. We provide a plurality of ratlines 52 extending between a pair of sides of the net form rungs for use when the net is to function as a ladder. We secure each ratline 52 to a pair of opposite sides of the net, such, for example, as sides 14 and 18, by any convenient means, such as tying, stitching or the like. Ratlines 52 are substantially parallel to a line passing through a pair of adjacent corners of the net, such, for example, as corners 26 and 28. The ratlines pass through the slots 48 in the intersecting net mesh members and are thus held securely to the net body and retained extending generally horizontally. The catenary configuration of the sides of the net ensures the even distribution of a load applied to a ratline 52 among the mesh members 46 making up the net.

It is to be understood that we may employ any suitable material for forming the peripheral member 10 and the mesh members 20, 22 and 46 of the net. Preferably, however, we employ a textile webbing similar to the webbing employed to form the cargo net disclosed in our above-identified copending application. This webbing is woven from yarns made up of synthetic filament threads spun to a predetermined number of convolutions per unit length.

In use, when the form of our ladder net shown in Figures 1 and 2 is to function as a ladder, it is suspended by the rings 24 at a pair of adjacent corners, such, for example, as corners 26 and 28. When so suspended, the net mesh members 22 which are parallel to a line passing through corners 26 and 28 function as the rungs of the ladder and the members 20 which are parallel to a line passing through corners 28 and 30 function as the uprights of the ladder. When a load is applied to the net, the catenary shape of sides 12, 14, 16 and 18 of the net ensures that the load is distributed substantially evenly among the mesh members making up the net. Further, this catenary shape of the net sides holds the net body taut and reduces substantially the sagging of the ladder rungs formed by members 22. The manner of securing a pair of intersecting net mesh members to one another by passing one member through a channel 42 in the member which it intersects prevents a member 22, acting as a rung, from tearing away from the net when the securing means, such as stitching or the like, breaks. This construction avoids the disadvantageous effects of a broken ladder rung.

In use of the form of our invention shown in Figures 3 and 4, when the net is to function as a ladder, it is suspended by rings 24 at a pair of adjacent corners, such, for example, as the corners 26 and 28. Ratlines 52, which are substantially parallel to a line extending between corners 26 and 28, act as rungs. The catenary shape of sides 12, 14, 16 and 18 ensures that a load applied to the net is substantially uniformly distributed among the net mesh members 46 and precludes sagging of horizontally extending rung members. The slotted construction employed for joining intersecting net mesh members prevents a net mesh member from being torn away from the net body in the event the stitching 50 breaks. This construction avoids the effect of a broken or sagging rung when stitching 50 breaks.

While we have shown and described our net as being intended primarily for use as a ladder net, it will readily be appreciated that alternately it may be used to handle cargo or to hold down cargo in ships, aircraft or the like.

It will be seen that we have accomplished the objects of our invention. We have provided a ladder net in which a load applied to the net when in use as a ladder is distributed substantially uniformly among mesh members of the net. Our net substantially eliminates sagging of the ladder rungs formed by the net mesh members. We interengage intersecting net mesh members at the points of intersection in a manner to prevent the effect of a broken rung in the event the securing means, such as stitching or the like, breaks.

It will be understood that certain features and subcombinations are of utility and may be employed without reference to other features and subcombinations. This is contemplated by and is within the scope of our claims. It is further obvious that various changes may be made in details within the scope of our claims with-

Having thus described our invention, what we claim is:

1. A ladder net including in combination a peripheral member forming a plurality of net sides, each of said sides being preshaped in the form of a catenary extending inwardly toward the center of the net, a plurality of individual intersecting net mesh members carried by said peripheral member, each of said net mesh members being a length of webbing formed with spaced slots, the arrangement being such that an intersecting net mesh member alternately passes through a slot of a mesh member which it intersects and has a mesh member which it interests passing through one of its slots, and a plurality of ratlines extending between a pair of said sides, said ratlines passing through a slot of one of said mesh members at a point of intersection.

2. A ladder net including in combination a peripheral member forming a plurality of net sides, each of said sides being preshaped in the form of a catenary extending inwardly toward the center of the net, said peripheral member providing a pair of adjacent corners, and a plurality of individual intersecting net mesh members carried by said peripheral member, said plurality of net mesh members including a group of members extending substantially parallel to a line passing through said pair of corners.

3. A ladder net as in claim 2 in which the remaining net mesh members other than those in said group extend substantially perpendicular to said group of net mesh members to form a rectangular net mesh configuration.

4. A ladder net as in claim 2 in which said group of members comprise a plurality of ratlines extending between a pair of said sides and in which the remaining intersecting net mesh members form a rhomboidal net mesh configuration.

5. A ladder net as in claim 2 in which said peripheral member is formed by a pair of webbing laminates, a plurality of said net mesh members each being formed of a length of webbing having an end, each of said lengths extending around said laminates with its end disposed between said laminates, and means for securing said end to the laminates.

References Cited in the file of this patent

UNITED STATES PATENTS

| 308,334 | Wright | Nov. 18, 1884 |
| 471,861 | Hohorst | Mar. 29, 1892 |
| 686,182 | Wright | Nov. 5, 1901 |
| 1,365,511 | Lee | Jan. 11, 1921 |
| 1,867,327 | Polsky | July 12, 1932 |
| 2,286,936 | Scrutton | June 16, 1942 |
| 2,440,712 | Bickell | May 4, 1948 |
| 2,659,956 | Lilienfeld | Nov. 24, 1953 |

FOREIGN PATENTS

| 607,325 | France | Mar. 26, 1926 |
| 697,189 | France | Oct. 27, 1930 |

UNITED STATES PATENT OFFICE
CERTIFICATE OF CORRECTION

Patent No. 2,925,141                          February 16, 1960

Leonard P. Frieder et al.

It is hereby certified that error appears in the printed specification of the above numbered patent requiring correction and that the said Letters Patent should read as corrected below.

Column 5, line 16, for "interests" read -- intersects --.

Signed and sealed this 26th day of July 1960.

(SEAL)
Attest:
KARL H. AXLINE
Attesting Officer

ROBERT C. WATSON
Commissioner of Patents